(No Model.)

T. FORSTNER.
PIPE WRENCH.

No. 599,169. Patented Feb. 15, 1898.

WITNESSES:

INVENTOR
T. Forstner
BY
ATTORNEYS.

UNITED STATES PATENT OFFICE.

THOMAS FORSTNER, OF NEW ULM, MINNESOTA.

PIPE-WRENCH.

SPECIFICATION forming part of Letters Patent No. 599,169, dated February 15, 1898.

Application filed April 26, 1897. Serial No. 633,915. (No model.)

*To all whom it may concern:*

Be it known that I, THOMAS FORSTNER, of New Ulm, in the county of Brown and State of Minnesota, have invented a new and Improved Wrench, of which the following is a full, clear, and exact description.

The object of the invention is to provide a new and improved wrench, more especially designed for use as a pipe-wrench and arranged to permit of conveniently adjusting the movable jaw close to the work and then locking it securely in place.

The invention consists principally of a jaw-casing carrying the movable jaw, fitted to slide on the fixed-jaw handle, and a dog adapted to engage the handle and carried by the said casing and adapted to be locked to the handle to hold the casing in place.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
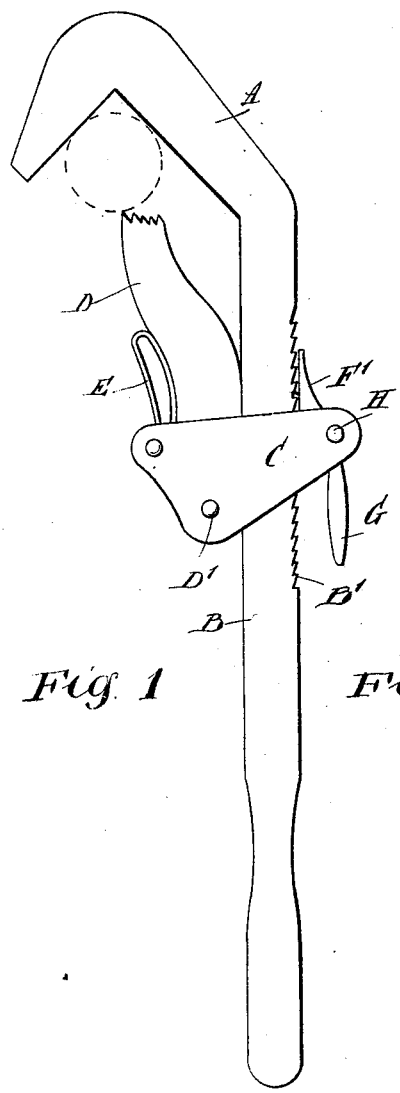
Figure 2:
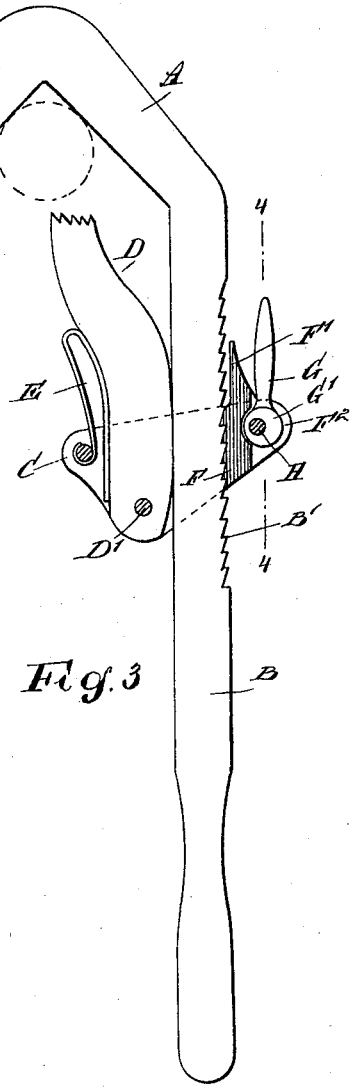
Figure 3:
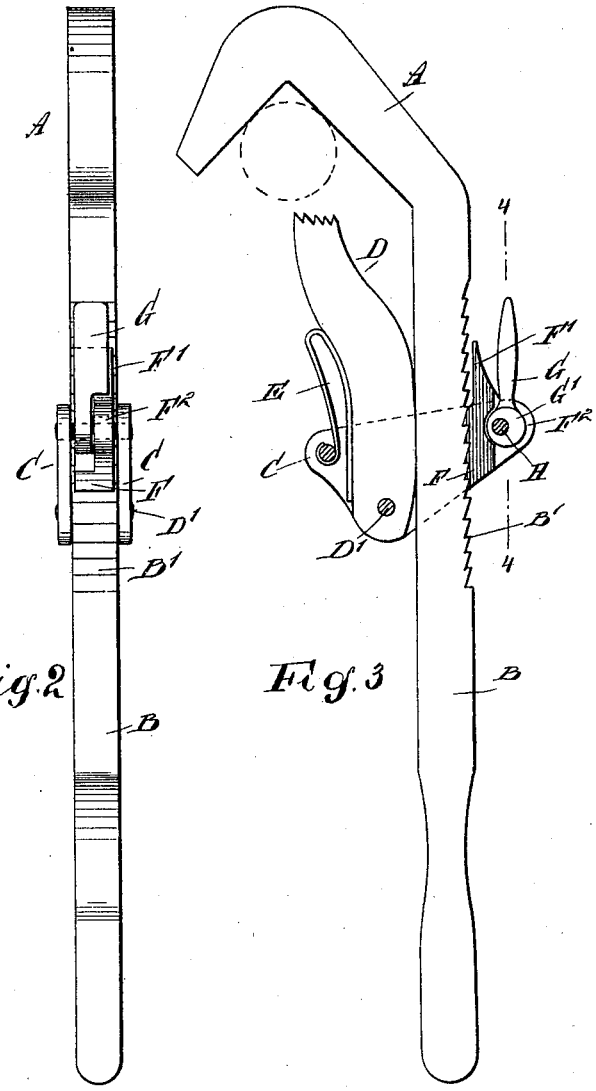
Figure 4:
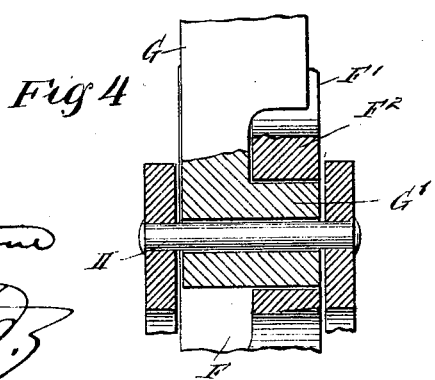

Figure 1 is a side elevation of the improvement. Fig. 2 is a back edge view of the same. Fig. 3 is a sectional elevation of the same, and Fig. 4 is an enlarged cross-section of part of the improvement on the line 4 4 of Fig. 3.

The fixed jaw A is preferably made V-shaped and is formed or secured on one end of the handle or stock B, on which is fitted to slide a casing C, provided with a transverse pivot D' for the movable jaw D, arranged to extend with its free end in alinement with the fixed jaw A and adapted to rest with part of its inner side against the coresponding side of the stock B. A spring E, held in the casing C, presses on the jaw D, so as to hold the same normally in contact with the stock, as plainly shown in Fig. 3. On the back edge of the stock B are formed teeth B', adapted to be engaged by the teeth of a dog F, formed at its forward end with a handle F' and provided with a lug F², hung on the hub G' of a lever G, eccentrically mounted on a pin H, secured in the sides of the casing C. When the lever G is thrown forward into the position shown in Fig. 3, the casing C can be moved forward or backward by the operator disengaging the dog F from the teeth B', which is done by swinging the outer end of the casing C forwardly and then sidewise to the right, the operator pressing on the finger-piece or handle F' of the dog F to move the latter out of engagement with the teeth B'. The operator can now move the casing C outwardly on the stock B, as the teeth of the dog are out of engagement with the teeth B'.

When it is desired to use the wrench, the casing C is first adjusted to bring the movable jaw D as close to the work as possible, as indicated in Fig. 3, and then the operator takes hold of the lever G and throws the same toward the handle end of the stock B into the position shown in Fig. 1, whereby the casing C is drawn to the right and is swung forwardly to move the free end of the jaw D in firm contact with the work, at the same time locking the casing C securely in position on the stock B.

It is understood that when the eccentrically-mounted lever G is swung around, as before described, and the casing C is drawn to the right the spring E is compressed, so as to hold the movable jaw D under considerable tension against the side of the stock B.

When the pipe or other article has been turned by the wrench to the desired position and the operator desires to release the wrench from the pipe, he simply swings the lever G back to its forward position, as shown in Fig. 3, so as to allow the casing C to swing downward and to move sidewise to the left by the action of the spring E to draw the jaw D away from the work. The wrench can then be readily disengaged from the work.

It will be seen that this pipe-wrench is very simple and durable in construction and is arranged to permit of quickly and conveniently adjusting the casing and the movable jaw close to the work and to then lock it securely in place.

Having thus fully described my invention, I claim as new and desire to secure by Letters Patent—

1. A pipe-wrench comprising a stock having a fixed jaw at one end, a casing slidable upon the stock and carrying means for locking the stock and casing, comprising a pivoted cam having an operating-arm attached and a toothed block carried thereby, and a jaw pivoted in the casing and against the inner side of the stock with its free end projecting toward the fixed jaw.

2. A pipe-wrench comprising a stock carrying the fixed jaw, a casing fitted to slide on the said stock, a movable jaw pivoted on the said casing, and a device for imparting a swinging motion to the casing to move the movable jaw to the work and to lock the casing to the stock, substantially as shown and described.

3. A pipe-wrench comprising a stock having teeth, a fixed jaw carried by the stock, a casing fitted to slide on the stock, a spring-pressed movable jaw pivoted in the said casing and engaging one side of the stock, a dog adapted to engage the teeth of the said stock, and a lever carrying the said dog and mounted eccentrically on the said casing, substantially as shown and described.

THOMAS FORSTNER.

Witnesses:
C. W. HEIMANN,
LOUIE MUELLER.